(12) United States Patent
Stählin et al.

(10) Patent No.: US 10,944,775 B2
(45) Date of Patent: Mar. 9, 2021

(54) AUTHENTICATION DEVICE FOR A VEHICLE

(71) Applicant: Continental Teves AG & Co. oHG, Frankfurt am Main (DE)

(72) Inventors: Ulrich Stählin, Rochester, MI (US); Marc Menzel, Weimar (DE); Klaus Rink, Rodenbach (DE)

(73) Assignee: Continental Teves AG & Co., oHG

( * ) Notice: Subject to any disclaimer, the term of this patent is extended or adjusted under 35 U.S.C. 154(b) by 134 days.

(21) Appl. No.: 16/338,507

(22) PCT Filed: Oct. 6, 2017

(86) PCT No.: PCT/DE2017/200107
§ 371 (c)(1),
(2) Date: Apr. 1, 2019

(87) PCT Pub. No.: WO2018/065016
PCT Pub. Date: Apr. 12, 2018

(65) Prior Publication Data
US 2019/0238579 A1    Aug. 1, 2019

(30) Foreign Application Priority Data

Oct. 6, 2016   (DE) ..................... 10 2016 219 348.1

(51) Int. Cl.
*H04L 29/06* (2006.01)
*H04L 12/40* (2006.01)
(52) U.S. Cl.
CPC .......... *H04L 63/1425* (2013.01); *H04L 12/40* (2013.01); *H04L 63/1466* (2013.01);
(Continued)

(58) Field of Classification Search
CPC . H04L 63/1425; H04L 63/1466; H04L 12/40; H04L 2012/40267; H04L 2012/40273
(Continued)

(56) References Cited

U.S. PATENT DOCUMENTS

| 9,866,542 B2 | 1/2018 | Baltes et al. |
| 2011/0080302 A1 | 4/2011 | Muthaiah et al. |

(Continued)

FOREIGN PATENT DOCUMENTS

| CN | 101464218 A | 6/2009 |
| CN | 202014271 U | 10/2011 |

(Continued)

OTHER PUBLICATIONS

German Search Report for German Application No. 10 2016 219 348.1, dated Jun. 28, 2017, with partial translation—10 pages.

(Continued)

*Primary Examiner* — Dant B Shaifer Harriman
(74) *Attorney, Agent, or Firm* — RatnerPrestia

(57) ABSTRACT

An authentication device for a vehicle, wherein the vehicle has a communications network for conveying communications data. The authentication device includes a communications interface which is connectable to the communications network of the vehicle, wherein the communications interface is configured to receive the communications data, and a processor which is configured to detect a characteristic of the received communications data, wherein the processor is configured to authenticate the communications data based on a comparison of the detected characteristic with a reference characteristic.

14 Claims, 2 Drawing Sheets

(52) U.S. Cl.
CPC ............ *H04L 2012/40267* (2013.01); *H04L 2012/40273* (2013.01)

(58) Field of Classification Search
USPC .......................................................... 726/23
See application file for complete search history.

(56) References Cited

U.S. PATENT DOCUMENTS

| | | |
|---|---|---|
| 2013/0165146 A1 | 6/2013 | Stählins et al. |
| 2014/0185463 A1* | 7/2014 | Likkei .................... H04L 12/40 370/250 |
| 2015/0178524 A1 | 6/2015 | Kwon |
| 2015/0271201 A1 | 9/2015 | Ruvio et al. |
| 2016/0205117 A1* | 7/2016 | Laifenfeld ............ H04L 63/123 726/23 |
| 2016/0373449 A1 | 12/2016 | Haga et al. |

FOREIGN PATENT DOCUMENTS

| | | |
|---|---|---|
| CN | 103119460 A | 5/2013 |
| CN | 104730449 A | 6/2015 |
| DE | 102013200535 A1 | 7/2014 |
| DE | 102016101327 A1 | 7/2016 |
| EP | 2892199 A1 | 7/2015 |
| JP | 2016134170 A | 7/2016 |

OTHER PUBLICATIONS

International Search Report and Written Opinion for International Application No. PCT/DE2017/200107, dated Dec. 7, 2017—9 pages.

Chinese Office Action for Chinese Application No. 201780060251.0, dated Dec. 2, 2020, 10 pages.

* cited by examiner

AUTHENTICATION DEVICE FOR A VEHICLE

CROSS REFERENCE TO RELATED APPLICATIONS

This application is the U.S. National Phase Application of PCT International Application No. PCT/DE2017/200107, filed Oct. 6, 2017, which claims priority to German Patent Application No. 10 2016 219 348.1, filed Oct. 6, 2016, the contents of such applications being incorporated by reference herein.

FIELD OF THE INVENTION

The present invention relates to an authentication device for a vehicle and to a method for the authentication of communications data in a vehicle.

BACKGROUND OF THE INVENTION

Vehicles which are developed for automated driving place particularly high demands on vehicle systems. In an automated driving situation, it cannot always be ensured that the traffic scene and the automated driving function implemented by the vehicle is apprehended and verified by the driver. Further, it cannot be ensured that the driver is always capable of successfully taking control of the vehicle in the event of a malfunction being determined within a period of time that is not critical with respect to safety. For this reason, vehicle systems such as control devices must be designed to take on the corresponding tasks reliably and independently.

However, the resulting increased complexity of the vehicle architecture can lead to new vulnerabilities for attempts at interference or misuse. In order to prevent this, security systems can be used for control devices. However, these security systems are usually developed in a view of particular misuse scenarios or attack scenarios. Attacks or attempts at misuse which were not yet known or regarded as relevant at the time of development are therefore typically not detected and prevented.

SUMMARY OF THE INVENTION

An aspect of the present invention aims to create an efficient concept for monitoring vehicle communications, in particular for authenticating communications data which are conveyed by a communications network of a vehicle.

According to a first aspect, the invention relates to an authentication device for a vehicle, the vehicle having a communications network for conveying communications data, with a communications interface which is connectable to the communications network of the vehicle, the communications interface being configured to receive the communications data, and with a processor which is configured to detect at least one characteristic of the received communications data, the processor being configured to authenticate the communications data based on a comparison of the detected characteristic with a reference characteristic. This achieves the advantage that the communications in the communications network of the vehicle can be efficiently monitored. Attempts at tampering with or misusing vehicle communications, by means of falsified or manipulated communications data, for example, can be detected by checking the authenticity of the communications data.

The authentication of the communications data may comprise a verification of the genuineness of the communications data and/or an identification of the communications data. The authentication of the communications data may further comprise checking the genuineness and/or correctness of the communications data.

The communications data may comprise control commands to a vehicle control or measurement values of vehicle sensors. The vehicle control and/or the vehicle sensors are connected to the communications network. The communications data may further comprise V2X (vehicle-to-X) communications data which have been received by a V2X communications interface of the vehicle. The communications data can form communications signals or messages.

The vehicle can be a motor vehicle, particularly a multi-track motor vehicle such as a passenger car or a truck, or a single-track motor vehicle such as a motorcycle. Further, the vehicle can be a rail vehicle, a water vehicle or an air vehicle, particularly an airplane or a helicopter. The vehicle can be configured for autonomous or highly automated locomotion.

The communications network can be designed as a bus system, particularly as a fieldbus or as a vehicle bus.

The processor can be designed as a control unit of the vehicle (electronic control unit, ECU) or can be integrated in a control unit of the vehicle. The processor can further be designed as a microprocessor.

The authentication device can be designed as a communications system or as a security system, particularly as a security observer, of the vehicle.

According to one embodiment, the at least one characteristic of the received communications data and the reference characteristic can comprise one of the following characteristics: a content of the communications data, a structure of the communications data, a logical sequence of the communications data, a temporal sequence of the communications data, a length of a communications signal which is formed by the communications data.

According to one embodiment, the processor is configured to detect an authenticity of the communications data if the characteristic of the communications data corresponds to the reference characteristic and to detect a missing authenticity of the communications data if the characteristic of the communications data differs from the reference characteristic. This achieves the advantage that inauthentic communications data can be efficiently detected.

According to one embodiment, the processor is configured to detect a receiver of the communications data in the communications network, the processor being configured to control the communications interface in response to the detection of the authenticity of the communications data for relaying the communications data to the receiver. This achieves the advantage that communications data which have been determined to be authentic can be efficiently relayed. The processor can detect the receiver of the communications data based on an address, particularly a network address, of the receiver, whereby the communications data comprises the address of the receiver. The receiver of the communications data can be a vehicle control which is connected to the communications network.

According to one embodiment, the processor is configured to send a warning message or an error message, particularly to a security system of the vehicle, in response to the detection of the missing authenticity of the communications data. This achieves the advantage that a security system or a driver of the vehicle can be efficiently alerted to the missing authenticity of the communications data.

The warning message and the error message can trigger various reactions of the security system. For example, when there is a warning message only a warning to the driver of the vehicle is generated, whereas when there is an error message the communications network is at least partially deactivated.

According to one embodiment, the processor is configured to detect a degree of the deviation of the characteristic from the reference characteristic, and the processor is configured to send the error message if the degree of the deviation exceeds a first threshold value and to send a warning message if the degree of the deviation falls below the first threshold value and exceeds a second threshold value.

The degree of the deviation can be a parameter or a value which is determined by the processor during a comparison of the characteristic with the reference characteristic based on an algorithm. The degree of the deviation can be a severity, measurement or size of the deviation. The threshold value can be a dynamic threshold value which depends, for example, on a type of or content of the communications data. If, for example, the communications data are communications data for carrying out particularly security-relevant vehicle systems, for example, a vehicle control, a smaller threshold value can be selected than when the communications data have a lower security relevance.

According to one embodiment, the processor is configured to detect a sender of the communications data in the communications network, and the processor is configured to separate a section of the communications network that comprises the sender from the rest of the communications network in response to the detection of a missing authenticity of the communications data. This achieves the advantage that vehicle systems can be protected efficiently from unauthenticated communications data.

The sender can be a communications interface, for example, a V2X communications interface, a vehicle sensor, for example, a speed sensor or an acceleration sensor, or a control unit. The separation of a section of the communications network can be carried out via a deactivation of a bus node of the communications network.

According to one embodiment, the authentication device comprises a storage, and the reference characteristic is stored in the storage.

According to one embodiment, the communications interface is configured to receive further communications data in a learning time interval, and the processor is configured to detect a characteristic of the further communications data and store it in the storage as reference characteristic. This achieves the advantage that the reference characteristic can be efficiently detected based on respective system surroundings of the vehicle.

According to one embodiment, the processor is configured to supplement, particularly to continuously supplement, the reference characteristic stored in the storage based on the detected characteristic of the communications data. This achieves the advantage that the reference characteristic can be adaptively adjusted based on respective system surroundings of the vehicle.

According to one embodiment, the communications interface is designed as a bus interface, and the bus interface is connectable to the communications network of the vehicle which is designed particularly as a vehicle bus.

According to one embodiment, the processor is designed as a control unit (electronic control unit, ECU) of the vehicle or is integrated in a control unit of the vehicle.

According to a second aspect, the invention relates a method for the authentication of communications data in a vehicle, wherein the vehicle has a communications network for conveying the communications data. The method comprises the following steps: reception of the communications data with a communications interface which is connectable to the communications network of the vehicle; detection of at least one characteristic of the received communications data; and authentication of the communications data based on a comparison of the detected characteristic with a reference characteristic. This achieves the advantage that the communications in the communications network of the vehicle can be efficiently monitored.

According to one embodiment, the method comprises the further following steps: detection of a missing authenticity of the communications data if the characteristic of the communications data differs from the reference characteristic; and sending a warning message or an error message in response to the detection of the missing authenticity of the communications data. This achieves the advantage that a security system or a driver of the vehicle can be efficiently informed about the missing authenticity of a communications signal.

According to a third aspect, the invention relates a vehicle, particularly a motor vehicle, with an authentication device according to the first aspect of the invention.

Aspects of the invention can be realized in hardware and/or software.

DETAILED DESCRIPTION OF THE INVENTION

Figure 1:
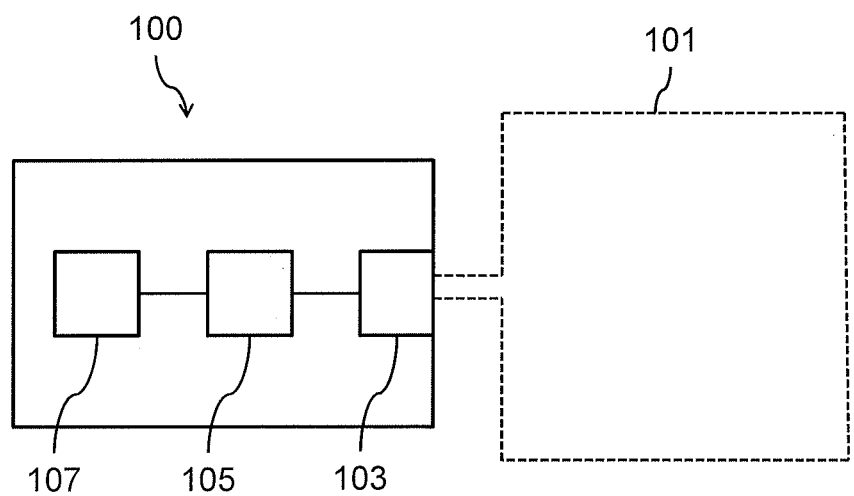
FIG. 1 shows a schematic view of an authentication device for a vehicle according to an embodiment.

In the following detailed description, reference is made to the accompanying drawings which form a part hereof and in which are shown by way of illustration specific embodiment forms in which aspects of the invention may be practiced. It is to be understood that other embodiment forms may also be utilized and structural or logical changes may be made without departing from the concept of aspects of the present invention. Therefore, the following detailed description is not to be taken in a limiting sense. It will further be appreciated that the features of the various embodiment examples described herein may be combined with each other insofar as not specifically indicated otherwise.

The aspects and embodiment forms are described with reference to the drawings, wherein like reference numerals generally refer to like elements. In the following description, for purposes of explanation, numerous specific details are set forth in order to provide a thorough understanding of one or more aspects of the invention. It may be evident, however, to one of ordinary skill in the art that one or more aspects or embodiment forms may be practiced with a lesser degree of the specific details. In other instances, known structures and elements are illustrated schematically to facilitate describing one or more aspects or embodiment forms. It will be appreciated that other embodiment forms may also be used and structural or logical changes may be carried out without departing from the concept of aspects of the present invention.

In addition, while a particular feature or a particular aspect of an embodiment form may have been disclosed with respect to only one of several implementations, such feature or such aspect may be combined with one or more other features or aspects of other implementations as may be desired and advantageous for any given or particular application. Furthermore, to the extent that the terms "including", "having", "with" or variants thereof are used in either the detailed description or the claims, such terms are intended to be inclusive in a manner similar to the term "comprising." The terms "coupled" and "connected," along with their derivatives, may be used. It will be appreciated that such terms are used to indicate that two elements cooperate or interact with one another regardless of whether they are in direct physical or electrical contact or are not in direct contact with one other. Further, the term "exemplary" merely means an example, rather than the best or optimal. The following description is therefore not to be interpreted in a limiting sense.

FIG. 1 shows a schematic view of an authentication device 100 for a vehicle according to one embodiment.

The vehicle has a communications network 101, particularly a bus system such as a fieldbus or a vehicle bus, for conveying communications data.

The authentication device 100 comprises a communications interface 103 which is connectable to communications network 101 of the vehicle, the communications interface 103 being configured to receive communications data. The authentication device 100 further comprises a processor 105 which is configured to detect at least one characteristic of the received communications data. The processor 105 is configured to authenticate the communications data based on a comparison of the detected characteristic with a reference characteristic.

Attempts to manipulate or misuse the vehicle communications, for example, by means of falsified or manipulated communications data, can be detected by checking the authenticity of the communications data.

The authentication of the communications data can comprise a verification of the genuineness of the communications data and/or an identification of the communications data. Further, the authentication of the communications data can comprise checking the genuineness and/or correctness of the communications data.

The communications data can comprise control commands to a vehicle control or measurement values of vehicle sensors. The vehicle control and/or vehicle sensors are connected to the communications network 101. The communications data can further comprise V2X (vehicle-to-X) communications data which have been received by a V2X communications interface of the vehicle. The communications data can form communications signals or messages.

The vehicle can be a motor vehicle, particularly a multi-track motor vehicle such as a passenger car or a truck, or a one-track motor vehicle such as a motorcycle. Further, the vehicle can be a rail vehicle, a water vehicle or an air vehicle, particularly an airplane or a helicopter. The vehicle can be configured for autonomous or highly automated locomotion.

The communications interface 103 can be designed as a bus interface which is connectable to the communications network 101 of the vehicle in order to receive the communications data.

The processor 105 can be designed as a control unit of the vehicle (electronic control unit, ECU) or can be integrated in a control unit of the vehicle. The processor 105 can further be designed as a microprocessor.

The authentication device 100 can be designed as a communications system or as a security system, particularly as a security observer, of the vehicle.

The authentication device 100 in FIG. 1 further comprises a storage 107. The reference characteristic can be stored in the storage 107. The storage 107 can be a flash storage. The storage 107 can be integrated in the ECU of the vehicle.

The processor 105 can be configured to detect an authenticity of the communications data if the characteristic of the communications data corresponds to the reference characteristic. The processor 105 can further be configured to detect a missing authenticity of the communications data if the characteristic of the communications data differs from the reference characteristic.

The characteristic of the received communications data and the reference characteristic can be, in each instance, at least one of the following characteristics: a content of the communications data, a structure of the communications data, a logical sequence of the communications data, a temporal sequence of the communications data, a length of a communications signal which is formed by the communications data.

The processor 105 can be configured to detect a receiver of the communications data in communications network 101. The processor 105 can further be configured to control the communications interface 103 in response to the detection of the authenticity of the communications data for relaying the communications data to the receiver. The receiver may be an addressee of the communications data in the communications network 101. The processor 105 can detect the receiver based on a network address of the receiver. The communications data can comprise the network address.

The receiver is a control unit of the vehicle or a security system of the vehicle, for example. The receiver can further be a display, for example, on which the communications data are visualized for a driver.

The processor 105 can be configured to send a warning message or an error message in response to the detection of the missing authenticity of the communications data. The warning message and/or error message can be sent to a security system of the vehicle.

The security system can be configured to alert the driver in response to the reception of the warning message or error message, for example, by means of an optical display or a warning signal. The security system can further be configured to control a further communications interface 103 of the vehicle, particularly a V2X communications interface 103 of the vehicle, to send the warning message or error message or a further message based on the warning message or error message in response to the reception of the warning message or error message.

The processor 105 can further be configured to detect a sender of the communications data in communications network 101. The processor 105 can be configured to separate a section of communications network 101 that comprises the sender from the rest of the communications network 101 as a response to the detection of the missing authenticity of the communications data.

The sender can be a communications interface, for example, a V2X communications interface, a vehicle sensor, for example, a speed sensor or an acceleration sensor, or a control unit. The separation of a section of communications network 101 can be carried out via a deactivation of a bus node of the communications network 101.

Figure 2:
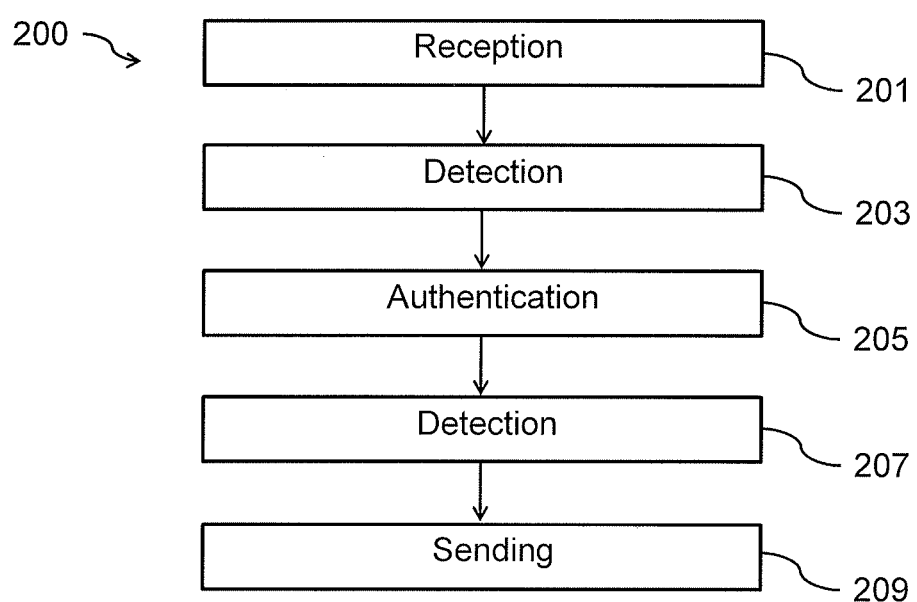
FIG. 2 shows a flowchart of a method for the authentication of communications data in a vehicle according to the embodiment.

FIG. 2 shows a flowchart for a method 200 for authenticating communications data in the vehicle according to one embodiment. The vehicle has the communications network 101 for conveying the communications data.

The method 200 comprises a reception 201 of the communications data with the communications interface 103 which is connectable to the communications network 101 of the vehicle, a detection 203 of at least one characteristic of the received communications data, and an authentication 205 of the communications data based on a comparison of the detected characteristic with the reference characteristic. The method 200 further comprises a detection 207 of a missing authenticity of the communications data if the characteristic of the communications data differs from the reference characteristic, and a sending 209 of a warning message or an error message in response to the detection of the missing authenticity of the communications data.

According to one embodiment, authentication device 100 is designed as security observer 100. The security observer 100 monitors a bus communication in the communications network 101 and checks it for correctness. In particular, the processor 105 of the authentication device 100 checks the authenticity of communications signals or messages in the communications network 101 which are formed by communications data.

If security observer 100 detects a behavior that does not correspond with the previous behavior on the vehicle bus, it can attempt to detect the cause of this behavior. Further, the security observer 100 can trigger a security alarm if necessary.

In order to detect deviations in the bus communications, particularly of communications signals with missing authenticity, the communications can be checked by the security observer 100 as follows:
(i) checking a correct structure and a correct length of the communications signals and checking whether or not the communications signals conform to predetermined time slots (if the vehicle bus 101 works with time slots);
(ii) checking a logical sequence of the communications signals: some communications signals, for example, are reactions to other communications signals or are a further processing of the contents of other communications signals. Therefore, these communications signals should also first appear after these communications signals on the vehicle bus 101;
(iii) checking a temporal sequence of the communications signals: some communications signals are conveyed in regular time intervals, for example, every 10 ms, or always with a determined time delay, for example, 1 ms, following another communications signal.
(iv) checking a content of the communications signals: the processor 105 can compare contents of different communications signals with each other and validate them. Subsequently, the processor 105 can check whether or not a technical error is present, for example, due to a failure of a sensor, or a deliberate attack. The processor 105 can distinguish between a technical error and a deliberate attack in a first approximation by means of physical or other relational models. In this regard, all detection methods can rely on a model assumption of the behavior of the communications under normal circumstances. Further, the processor 105 can perform classic intrusion detection methods.

According to one embodiment, the authentication of communications data is carried out either based on a threshold value method in which, for example, it is only determined whether or not communications data are authentic. Further, the processor 105 can also detect an integrity of the communications data during the authentication of the communications data.

The processor 105 can detect even smaller deviations of the characteristic of the communications data from the reference characteristic, for example, even when these smaller deviations are not yet to be assessed as critical. This allows abnormal or potentially at-risk vehicle systems which are connected to the communications network 101 to be ignored or deactivated already at an early stage, for example, in that a signal for deactivating the communications is sent to a bus node of the corresponding vehicle systems. In this way, a gradual separation of the impaired vehicle system from the communications network 101 can be carried out.

According to one embodiment, the reference characteristic of the communications data is initially determined generically for different driving situations or behaviors of the driver and stored in the storage 107. Subsequently, the reference characteristic can be supplemented or taught during a vehicle development based on measurement data in defined measurement situations and/or behavior models. Accordingly, the security observer 100 can be developed independently from the behavior of other ECUs at the vehicle bus 101 and can be precisely adapted or adjusted to the respective system surroundings.

According to one embodiment, an adaptive security observer 100 can be used instead of an a-priori concept of the type mentioned above for determining the reference characteristic. In the case of an adaptive security observer 100, the processor 105 detects a change in the communications system 101, particularly of the typical communications data which are conveyed in the communications system 101, with the time and continuously updates the stored reference characteristics.

According to one embodiment, various solutions for setting the reference characteristic can be combined with one another, for example, in that some rule types can be adapted during development and others can be learned first during the initial miles traveled by the vehicle.

According to one embodiment, the authentication device 100 is combined with a safety monitoring device (safety observer) in a control device of the vehicle. Accordingly, diverse analysis methods can be used for both goals of safety and security, and synergies can therefore be made use of. In the combined application of the authentication device 100 and the safety monitoring device, the following various errors and/or risks can be detected:
(i) willful tampering in the communications network 101 (intrusion, security-relevant);
(ii) outages of the communications network 101 (due, for example, to a failure of components);
(iii) malfunctions in the communications network 101 (for example, false results due to development errors);
(iv) unpredictable reactions of the communications network 101 because the system is operated outside a design operating range (for example, higher ambient temperatures, shaking, accelerations or impermissible inputs in electrical or software interfaces, etc.).

According to one embodiment, the processor 105 stores the authentication results of the security observer 100 in the storage 107. The storage 107 can comprise an event data recorder for this purpose. Accordingly, the reason for a malfunction can also be determined retrospectively. However, the event data recorder can also be accommodated in another control device.

According to one embodiment, the processor 105 additionally stores a security integrity measurement in the storage 107. The processor 105 can determine the security integrity measurement based on a decision rule, and the security integrity measurement defines a severity or a priority of a detected error. In this way, the course of the malfunction or a chain of events which led to the error can be reconstructed more easily. The storage can also be accommodated in another control device.

According to one embodiment, the expenditure for security monitoring in the vehicle can be reduced by the central security observer 100 because it need not be carried out anew in every ECU of the vehicle but rather only in a single ECU, or there need only be a small quantity of ECUs. In addition, synergies with respect to algorithms can be achieved by means of the combination with a safety observer and, accordingly, differentiated declarative statements can also be derived.

LIST OF REFERENCE NUMERALS 100 authentication device
101 communications network
103 communications interface
105 processor
107 storage
200 method for the authentication of communications data in a vehicle
201 reception
203 detection
205 authentication
207 detection
209 sending

The invention claimed is:

1. An authentication device for a vehicle, wherein the vehicle has a communications network for conveying communications data, comprising:
a communications interface which is connectable to the communications network of the vehicle, wherein the communications interface is configured to receive the communications data; and
a processor which is configured to detect a characteristic of the received communications data, wherein the processor is configured to authenticate the communications data based on a comparison of the detected characteristic with a reference characteristic,
wherein the processor is configured to send a warning message or an error message, to a security system of the vehicle, in response to the detection of the missing authenticity of the communications data, and
wherein the processor is configured to detect a degree of deviation of the characteristic from the reference characteristic, wherein the processor is configured to send the error message if the degree of the deviation exceeds a first threshold value and to send a warning message if the degree of the deviation falls below the first threshold value and exceeds a second threshold value.

2. The authentication device according to claim 1, wherein the characteristic of the received communications data and the reference characteristic comprise one of the following characteristics: a content of the communications data, a structure of the communications data, a logical sequence of the communications data, a temporal sequence of the communications data, a length of a communications signal which is formed by the communications data.

3. The authentication device according to claim 1, wherein the processor is configured to detect an authenticity of the communications data if the characteristic of the communications data corresponds to the reference characteristic and to detect a missing authenticity of the communications data if the characteristic of the communications data differs from the reference characteristic.

4. The authentication device according to claim 3, wherein the processor is configured to detect a receiver of the communications data in the communications network, wherein the processor is configured to control the communications interface in response to the detection of the authenticity of the communications data for relaying the communications data to the receiver.

5. An authentication device for a vehicle, wherein the vehicle has a communications network for conveying communications data, comprising:
a communications interface which is connectable to the communications network of the vehicle, wherein the communications interface is configured to receive the communications data; and
a processor which is configured to detect a characteristic of the received communications data, wherein the processor is configured to authenticate the communications data based on a comparison of the detected characteristic with a reference characteristic,
wherein the processor is configured to detect an authenticity of the communications data if the characteristic of the communications data corresponds to the reference characteristic and to detect a missing authenticity of the communications data if the characteristic of the communications data differs from the reference characteristic,
wherein the processor is configured to send a warning message or an error message, to a security system of the vehicle, in response to the detection of the missing authenticity of the communications data,
wherein the processor is configured to detect a degree of deviation of the characteristic from the reference characteristic, wherein the processor is configured to send the error message if the degree of the deviation exceeds a first threshold value and to send a warning message if the degree of the deviation falls below the first threshold value and exceeds a second threshold value.

6. The authentication device according to claim 3, wherein the processor is configured to detect a sender of the communications data in the communications network, wherein the processor is configured to separate a section of the communications network that comprises the sender from the rest of the communications network in response to the detection of a missing authenticity of the communications data.

7. The authentication device according to claim 1, wherein the authentication device comprises a storage, wherein the reference characteristic is stored in the storage.

8. The authentication device according to claim 7, wherein the communications interface is configured to receive further communications data in a learning time interval, wherein the processor is configured to detect a characteristic of the further communications data and store it in the storage as the reference characteristic.

9. The authentication device according to claim 6, wherein the processor is configured to supplement the reference characteristic stored in the storage based on the detected characteristic of the communications data.

10. The authentication device according to claim 1, wherein the communications interface is designed as a bus interface, wherein the bus interface is connectable to the communications network of the vehicle which is designed as a vehicle bus.

11. The authentication device according to claim 1, wherein the processor is designed as a control unit of the vehicle or is integrated in a control unit of the vehicle.

12. A method for the authentication of communications data in a vehicle, wherein the vehicle has a communications network for conveying the communications data, the method comprising:

receiving the communications data with a communications interface which is connectable to the communications network of the vehicle;

detecting, by a processor, a characteristic of the received communications data;

authenticating the communications data based on a comparison of the detected characteristic with a reference characteristics;

detecting, by the processor, an authenticity of the communications data if the characteristic of the communications data corresponds to the reference characteristic and to detect a missing authenticity of the communications data if the characteristic of the communications data differs from the reference characteristic; and sending, by the processor, a warning message or an error message, to a security system of the vehicle, in response to the detection of the missing authenticity of the communications data, wherein the processor is configured to detect a degree of the deviation of the characteristic from the reference characteristic, and wherein the processor is configured to send the error message if the degree of the deviation exceeds a first threshold value and to send a warning message if the degree of the deviation falls below the first threshold value and exceeds a second threshold value.

13. A vehicle, with an authentication device according to claim 1.

14. The authentication device according to claim 6, wherein the processor is configured to continuously supplement the reference characteristic stored in the storage based on the detected characteristic of the communications data.

\* \* \* \* \*